United States Patent
Pillot et al.

(10) Patent No.: US 8,366,586 B2
(45) Date of Patent: Feb. 5, 2013

(54) METHOD FOR OBTAINING FUEL-LOADED EXHAUST GASES AND RELATED MOTOR VEHICLE

(75) Inventors: Adrien Pillot, Rueil-Malmaison (FR); Celine Etcheverry, Sceaux (FR); Fabien Godon, Ustaritz (FR); Stephane Sadai, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 1068 days.

(21) Appl. No.: 12/067,054

(22) PCT Filed: Sep. 21, 2006

(86) PCT No.: PCT/FR2006/050917
§ 371 (c)(1),
(2), (4) Date: Jan. 5, 2009

(87) PCT Pub. No.: WO2007/034119
PCT Pub. Date: Mar. 29, 2007

(65) Prior Publication Data
US 2009/0221400 A1   Sep. 3, 2009

(30) Foreign Application Priority Data

Sep. 21, 2005   (FR) .................................. 05 09634

(51) Int. Cl.
*F16H 59/74* (2006.01)
*F16H 59/30* (2006.01)
(52) U.S. Cl. ........................................ 477/100; 477/121
(58) Field of Classification Search .................. 477/100, 477/121
See application file for complete search history.

(56) References Cited

U.S. PATENT DOCUMENTS

| 5,997,434 | A | 12/1999 | Graf et al. |
| 7,153,342 | B2 * | 12/2006 | Koga et al. ................... 95/20 |
| 2003/0145582 | A1 | 8/2003 | Bunting et al. |
| 2004/0204289 | A1 * | 10/2004 | Inoue et al. .................. 477/107 |

FOREIGN PATENT DOCUMENTS

| EP | 1382812 | 1/2004 |
| EP | 1437492 | 7/2004 |
| FR | 2820462 | 8/2002 |
| FR | 2862096 | 5/2005 |

* cited by examiner

*Primary Examiner* — Edwin A Young
(74) *Attorney, Agent, or Firm* — Oblon, Spivak, McClelland, Maier & Neustadt, L.L.P.

(57) ABSTRACT

A method for obtaining fuel-loaded exhaust gases by late and/or delayed injection(s) of fuel into a Diesel engine combustion chamber of a motor vehicle including an automatic gearbox robotized or with constant torque variation. The laws defining the reduction ratio of the gearbox are modified to limit dilution of the fuel in the oil present in the combustion chamber.

14 Claims, 2 Drawing Sheets

METHOD FOR OBTAINING FUEL-LOADED EXHAUST GASES AND RELATED MOTOR VEHICLE

BACKGROUND

The invention relates to a method for obtaining fuel-loaded exhaust gases in a diesel engine.

This invention more particularly relates to motor vehicles having diesel engines equipped with an automatic, robotized or continuously variable torque (CVT) gearbox.

Such a method for obtaining fuel-loaded exhaust gases can, in particular, be implemented during a particulate filter regeneration phase in a motor vehicle comprising a particulate filter and an oxidation catalyst on its exhaust line.

In order to comply with the new pollution control regulations, it is known how to use a particulate filter, installed in the exhaust line downstream of the engine combustion chambers. This particulate filter retains the polluting particulates which accumulate therein with the running of the diesel engine.

The accumulation of particulates in the particulate filter causes clogging of the particulate filter which considerably hinders the removal of the exhaust gases from the engine. This causes a high backpressure in the exhaust line which affects engine performance.

In order to remove the particulate accumulated in the particulate filter, it is known how to periodically burn the particulates present in the particulate filter during phases called regeneration phases. For this purpose, the temperature of the exhaust gases is increased in order to increase the temperature of the particulates and to initiate their combustion.

One known solution for increasing the exhaust gas temperature is to adopt a particular injection method during the particulate filter regeneration phases. A first injection is carried out in the combustion chamber in the conventional way, that is, during the compression stroke of the piston movement in the combustion chamber, and then one or more additional injections, called delayed injections, are performed. In the context of the present invention, delayed injection means a fuel injection into the combustion chamber during the expansion stroke when the engine crankshaft has passed its position corresponding to the top dead center of the piston by an angle of between 30 and 40°.

A further or alternative solution consists in making one or more injections called late injections. In the context of the present invention, late injection means a fuel injection into the combustion chamber during the expansion stroke when the crankshaft has passed its position corresponding to the top dead center by an angle of between 100 and 130°.

By means of these late or delayed injections, it is possible to load the exhaust gases of the engine with fuel. This is because, like the fuel injected during a delayed injection, the fuel injected during a late injection is not completely burned in the combustion chamber. Part of the fuel reaches a catalytic portion of the exhaust line, conventionally provided for oxidizing residual hydrocarbons and carbon monoxide. The fuel is oxidized therein, thereby increasing the temperature of the gases in the oxidation catalyst, and downstream thereof. The gases thus heated can then be used for regenerating the particulate filter.

The methods comprising one or more delayed and/or late injections thereby serve to load the exhaust gases of a diesel engine with fuel, for example, to regenerate a particulate filter. More generally, they serve to increase the fuel concentration in the exhaust gases leaving the combustion chamber.

However, since the injection takes place during the expansion stroke, part of the fuel injected is practically sprayed directly on the liner of the cylinder which, with the piston and the cylinder head, bounds the combustion chamber. This fuel may then be diluted in the oil coating said liner. This dilution raises at least two problems. On the one hand, the lubricating oil flows along the cylinder liner to the lower crankcase of the engine. In this way, the diluted fuel soils the lubricating oil in the lower crankcase, thereby reducing the lubricating properties of the oil, and possibly causing serious problems in the engine and significantly shortening its life. On the other hand, this fuel being diluted in the oil is not expelled with the exhaust gases, thereby reducing the fuel content thereof to be burned in the oxidation catalyst.

BRIEF SUMMARY

It is the object of the invention to propose a method for obtaining exhaust gases comprising fuel while significantly reducing the dilution of the fuel in the oil in the combustion chamber.

This aim of the invention is achieved by a method for obtaining exhaust gases loaded with fuel by late and/or delayed fuel injection(s) into a combustion chamber of a diesel engine of a motor vehicle provided with an automatic, robotized or constantly variable torque gearbox, characterized in that the laws defining the reduction ratio of said gearbox are modified to limit the dilution of the fuel in the oil present in the combustion chamber.

As shown in greater detail in the rest of the description, it is thus possible, by adjusting the reduction ratio of the gearbox, to prevent the engine from running in an operating zone with critical dilution of the fuel injected during the late and/or delayed injections.

According to a first alternative of the invention, the laws defining the reduction ratio of the gearbox are only modified if the engine operates in an operating zone with critical dilution of the fuel in the oil.

Thus, advantageously, the reduction ratio is only modified if necessary, and, for the rest of the time, the laws defining the reduction ratio of the gearbox are left unchanged. The operation is thus practically imperceptible to the driver. However, an additional sensor is necessary to determine the engine operating point.

According to a second alternative of the invention, the laws defining the reduction ratio of said gearbox are modified as soon as the engine operates in late and/or delayed injection mode.

Thus, it is unnecessary to add the additional sensor. The method can therefore be implemented without additional cost.

Preferably, the laws defining the reduction ratio of said gearbox are only modified if the engine operates at an engine speed lower than an engine speed threshold, the reduction ratio of the gearbox then being decreased.

Thus, advantageously, it is proposed to move the engine operating point closer to the boundary of the dilution zone or even outside the dilution zone by increasing the engine speed.

Preferably, the laws defining the reduction ratio of the gearbox are only modified if the engine operates at an engine load lower than an engine load threshold, the reduction ratio of the gearbox then being increased.

Thus, advantageously, it is proposed to move the engine operating point closer to the boundary of the dilution zone or even outside the dilution zone by increasing the engine load.

Preferably, in the case of an automatic or robotized gearbox, the gearbox is controlled according to at least one modified gear shift transition law different from the nominal gear shift transition law.

Thus, advantageously, it is possible to control the changes in gearbox ratios so as to prevent the engine from operating in a critical dilution operating zone. This solution is easy to implement.

Preferably, in operating conditions of the engine in which the nominal gear shift transition law associates a first gear, the modified law associates a second higher gear.

Advantageously, it is thus possible to force the engine to operate with a higher engine load, which, as will be shown below, moves the engine operating point away from the zone of critical dilution of the fuel in the oil.

Preferably, the nominal and modified laws being a function of the accelerator pedal angle and of the speed of the vehicle, the modified law has a plateau at a first accelerator pedal angle in a vehicle speed range in which the nominal law has a plateau at a second accelerator pedal angle lower than the first accelerator pedal angle.

Thus, advantageously, the gear shift transition law is simply modified in order to force the engine to operate with a high load.

The invention also relates to a method for regenerating a particulate filter mounted in an exhaust line of a motor vehicle comprising an oxidation catalyst mounted upstream of or built into said particulate filter, said motor vehicle being of diesel engine type and having an automatic, robotized or continuously variable torque gearbox, notable in that soot accumulated in said particulate filter is burned using the heat generated by the combustion, which takes place at least partly in said oxidation catalyst, of fuel conveyed by said exhaust gases obtained according to a method as described above in all its alternatives.

The invention also relates to a motor vehicle of the diesel engine type with an automatic, robotized or continuously variable torque gearbox, notable in that it comprises an electronic unit for gearbox control suitable for implementing the method for obtaining exhaust gases loaded with fuel as described above in all its alternatives.

Finally, the invention also relates to a motor vehicle as described above, further comprising an exhaust line in which a particulate filter is mounted coupled with an oxidation catalyst mounted upstream of the particulate filter or in the particulate filter, notable in that soot accumulated in said particulate filter is burned using the heat generated by the combustion, which takes place at least partly in said oxidation catalyst, of fuel conveyed by said exhaust gases.

BRIEF DESCRIPTION OF THE DRAWINGS

Other advantages and features of the invention will appear from the description that follows, provided exclusively as an illustrative and nonlimiting example, with reference to the appended figures, in which.

DETAILED DESCRIPTION

As a reminder, the load Ch of an engine at a given speed n is defined in an equivalent manner by the following equations:

$$Ch(n) = \frac{Pe(n)}{Pe_{max}(n)} \tag{E1}$$

$$Ch(n) = \frac{C(n)}{C_{max}(n)} \tag{E2}$$

where:
Pe(n) is the engine power at the given speed n;
$Pe_{max}(n)$ is the maximum engine power at the same given speed n;
C(n) is the engine torque at the given speed n;
$C_{max}(n)$ is the maximum engine torque at the same given speed n.

Furthermore, in the rest of the description, a distinction is made between the gearbox reduction ratio and the gearbox gear ratio.

The reduction ratio $\eta_{reduction}$ is defined, in a manner known per se, by:

$$\eta_{reduction} = \frac{\eta_{secondaryshaft}}{\eta_{primaryshaft}}$$

where $\eta_{primary shaft}$ and $\eta_{secondary shaft}$ define the angular speed of the primary shaft and of the secondary shaft respectively of the gearbox considered.

The gear ratio designates the engaged speed and therefore only concerns automatic and robotized gearboxes. Each gear ratio of an automatic or robotized gearbox corresponds to a gearbox reduction ratio.

Furthermore, a distinction is also made in the rest of the description between the gear shift transition laws called nominal, that is, shift laws implemented in the "normal" injection phase without late injection or delayed injection, and the modified gear shift transition laws implemented during all or part of the modified injection phases, that is comprising at least one delayed injection and/or at least one late injection.

At the present time, only laboratory analyses serve to measure the proportion of fuel diluted in the lubricating oil of an engine. These analyses serve to chart a mapping of the rate of oil dilution by the engine fuel as a function of the engine load and the engine speed. An example of such a mapping is shown in FIG. 1.

Figure 1:
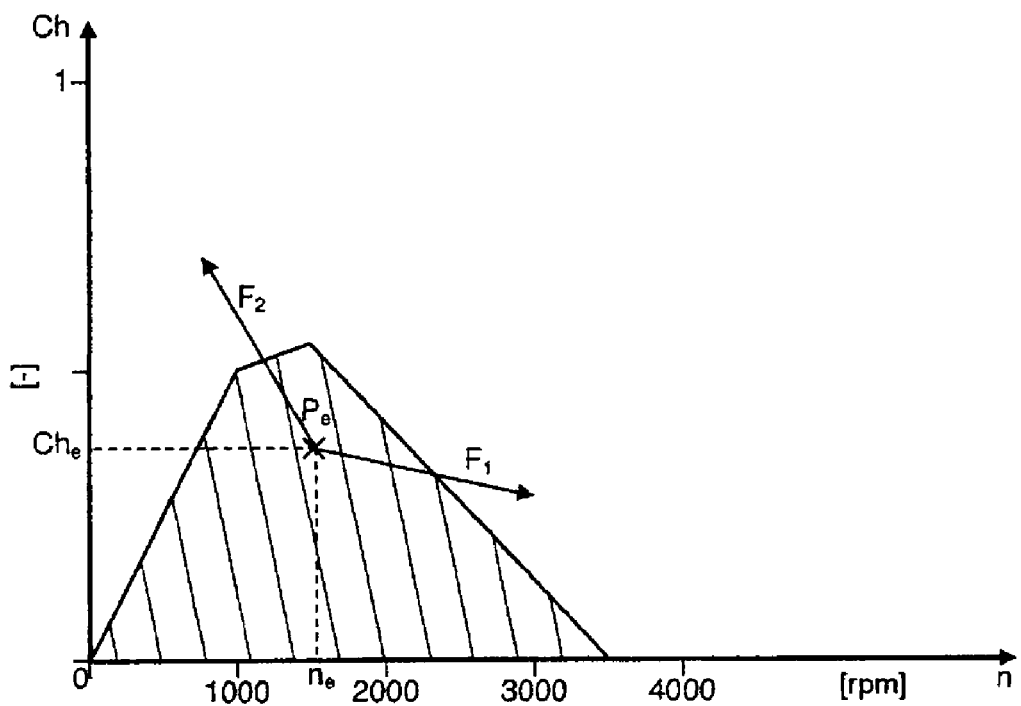
FIG. 1 schematically shows an example of a mapping of the zone of oil dilution by the fuel in a diesel engine as a function of the engine load and the engine speed.

In FIG. 1, the crosshatched zone corresponds to the operating zone of a diesel engine, in which part of the fuel injected into the combustion chamber according to a delayed and/or late injection method is diluted in the lubricating oil of an engine which coats the cylinder liner. This FIG. 1 and other mappings prepared and not shown here, reveal a tendency to high dilution of the oil in the low load engine operating points, particularly at moderate speed, the dilution of the oil by the fuel decreasing as the load increases while the engine speed is constant.

Obviously, as the boundary of this dilution zone approaches, the dilution of the fuel by the oil is decreased.

According to the invention, it is proposed to prevent the engine from operating in a critical dilution zone by modifying the gearbox gear ratio.

According to a first solution, the modification of this gearbox reduction ratio is such as to decrease the gearbox reduction ratio. Thus, by substantially maintaining the same vehicle speed, the engine speed is increased. In FIG. 1, for example, if we consider that the starting point is point Pe corresponding to a load $Ch_e$ and an engine speed $n_e$, this modification of the gearbox reduction ratio shifts the operating point Pe in the direction of the arrow $F_1$ toward an engine operating zone in which the fuel dilution in the oil is lower.

For example, for an automatic or robotized gearbox in automatic mode, the gear shift transition laws can be modified. This modification may consist in that, at a given speed corresponding to a first gear according to the nominal gear shift transition laws, the modified gear shift transition law associates a lower gear, preferably the next lower gear, which corresponds to a lower reduction ratio. In fact, the engine speed is thereby increased and the engine operating point is therefore shifted toward an engine operating zone at higher speed and lower load, where the dilution of the fuel in the oil is lower.

This modification is particularly appropriate for vehicle speeds corresponding to a speed range of between 1500 and 3500 rpm, because the dilution zone boundary curve decreases in this range.

According to another solution, it is proposed, on the contrary, to increase the gearbox reduction ratio.

In fact, if we consider a motor vehicle at a speed $v_a$, having a gear ratio $r_a$ and at engine speed $n_a$ corresponding to the gear ratio $r_a$ and to the speed $v_a$, the engine delivers a torque $C(n_a)$.

If we now consider the same vehicle at the same speed $v_a$, but at the gear ratio $r_b$ next higher to $r_a$, the engine speed varies and is equal to $n_b$, where $n_b$ is lower than $n_a$. Under these conditions, the engine then delivers a torque $C(n_b)$.

It is known that in this case, the load $Ch(n_b)$ is higher than the load $Ch(n_a)$.

The engine load is thereby increased by increasing the gearbox reduction ratio, that is, in the case of an automatic or robotized gearbox, by engaging a higher gear while keeping the vehicle speed constant. In FIG. 1, if we consider point Pe as the starting point, such a modification of the gearbox reduction ratio shifts the engine operating point in the direction of the arrow $F_2$, toward an engine operating zone at higher load and lower speed, in which the dilution of the fuel in the oil is less critical.

In particular, in an automatic or robotized gearbox in automatic mode, the gear shift transition laws can be modified to prevent the engine from running with an excessively low load and, in particular, to modify the gear shift transition laws so that, if the engine runs with an excessively low load, a gear shift is carried out and a higher gear, preferably the next higher gear, to the one initially used, is engaged.

Figure 2:
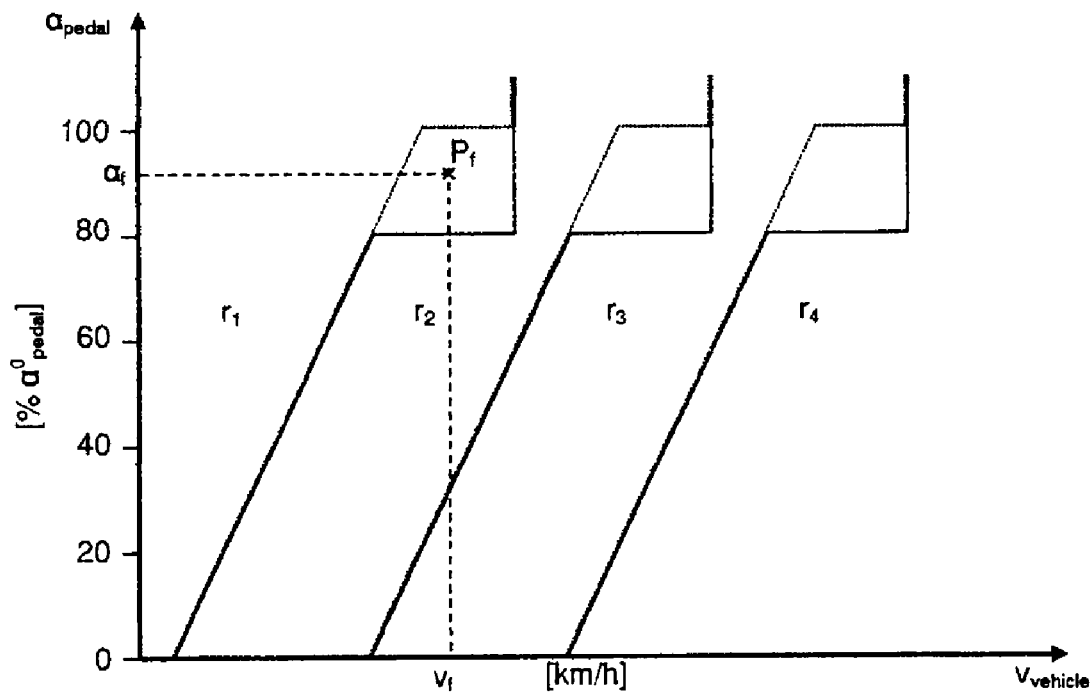
FIG. 2 shows a set of gear shift transition laws of an automatic gearbox as a function of the accelerator pedal angle and the vehicle speed, in a "normal" phase and in a "particulate filter regeneration" phase, and FIG. 3 schematically shows the operation of a device for implementing the method according to the invention.

FIG. 2 schematically shows a modification of the gear shift transition laws achieving this aim of limiting the operation of the engine at low load, in an automatic gearbox with four gears $r_1$, $r_2$, $r_3$ and $r_4$. In the context of the present invention, "gear shift transition law" means more precisely a law defining a gear shift to an adjacent gear as a function of the accelerator pedal angle $\alpha_{pedal}$ and of the vehicle speed $v_{vehicle}$.

In this FIG. 2, the accelerator pedal angle $\alpha_{pedal}$ is shown as a percentage of the accelerator pedal angle $\alpha^0$pedal corresponding to the hard spot of the pedal, while the vehicle speed is shown in km/h.

In this FIG. 2, the solid lines represent the various nominal shift laws, while the dotted lines represent the modified gear shift transition laws, according to the invention.

As shown in FIG. 2, the nominal shift laws in this example are the laws presenting a first linear part for a pedal angle between 0 and 80% and then presenting a horizontal plateau at this value of accelerator pedal angle equal to 80% of the angle $\alpha^0$pedal. The shift laws terminate in a vertical portion in FIG. 2 which corresponds to an accelerator pedal angle higher than 80% of the angle $\alpha^0$pedal. This pressing of the accelerator is permissible, for example, in order to enable the driver to order a downshift which increases the engine speed, or to order the deactivation of the speed controller or the cruise control.

The laws modified during the late and/or delayed injection phases as shown in FIG. 2, present a first part substantially identical to the linear part of the nominal laws, with the difference that the modified laws present a plateau at an accelerator pedal angle equal to 100% of the angle $\alpha^0$pedal and no longer at a pedal angle equal to 80%.

Figure 3:
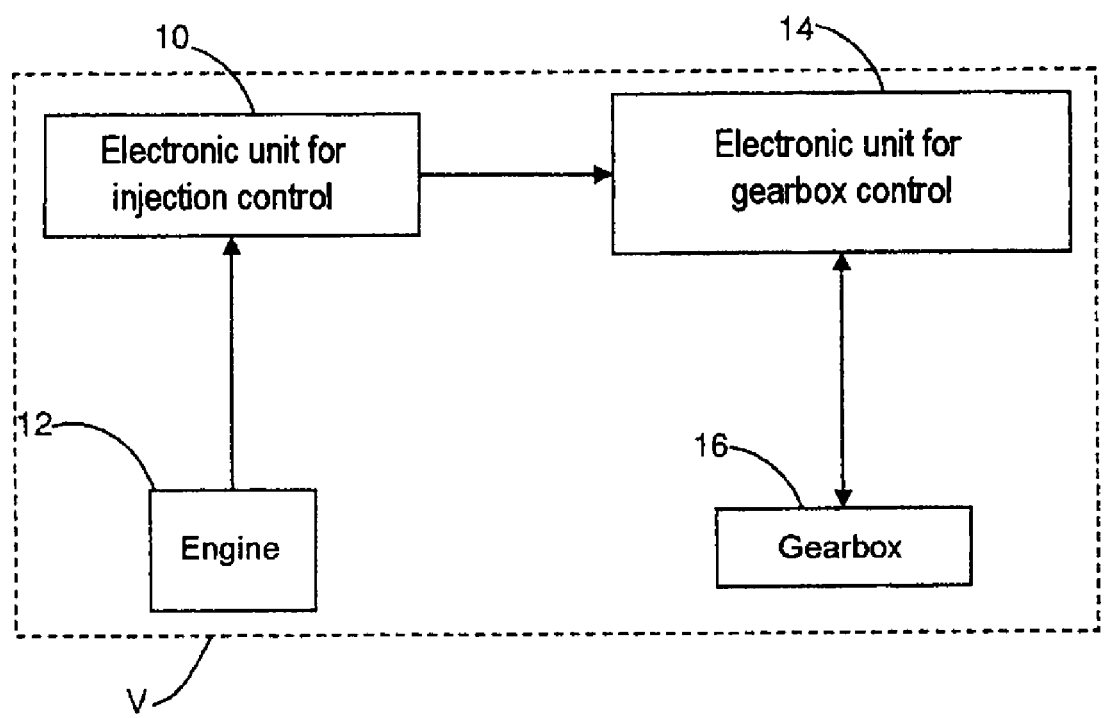

Thus, the operating point indicated $P_f$ in FIG. 3, which corresponds to a vehicle speed $v_f$ and an accelerator pedal angle $\alpha_f$ corresponds, according to the nominal gear shift transition laws to the gear $r_1$, while it corresponds to the gear $r_2$, higher than $r_1$, according to the modified gear shift transition laws. Thus, with the modified gear shift transition laws, the gearbox tends to force the shift to a higher gear than the one that would be engaged according to the nominal gear shift transition laws.

Obviously, other modifications are possible. It is conceivable in particular that the gear shift transition laws can be modified in such a way that the linear parts of the laws are shifted to the left of FIG. 2 and/or that the slope of these linear parts is higher so that for the same accelerator pedal angle, the speed of the vehicle shifting to higher gear in the modified shift laws is lower than the speed of the vehicle engaging the same gear shift transition in the nominal transition laws. The gear shift transition laws may also be a function of other parameters such as, for example, the engine load, the engine speed, or even the slope of the road on which the motor vehicle travels. These laws may also be modified in order to prevent the engine from running with an excessively low engine load.

FIG. 3 schematically shows the operation of a device for implementing the method for obtaining gases loaded with fuel according to the invention in a vehicle V.

The device in FIG. 3 comprises an electronic unit for injection control 10 controlling the fuel injection in the engine 12, and an electronic unit for transmission control 14 controlling a gearbox 16 of the type having an automatic, robotized in automatic operation, or CVT gearbox.

In order to implement the method for obtaining exhaust gases loaded with fuel according to the invention, the injection laws contained in the electronic unit for injection control 10 are modified in a manner known per se, in order to modify the injection method and to carry out one or more delayed injections and/or one or more late injections. In order to decrease the dilution of the fuel in the oil due to the specific injection settings, a request is sent by the electronic unit for injection control 10 to the electronic unit for transmission control 14 so that the latter takes account of the modified status of the injection laws.

The electronic unit for transmission control 14 then modifies the gear shift transition laws in order to prevent the engine from running in a speed/load operating zone in which the dilution of the fuel by the oil is critical, that is, when it is of the order of 6 to 8%. The electronic unit for injection control 14 can, for example, modify the gear shift transition laws as described above with regard to FIG. 2. By adopting modified gear shift transition laws, the electronic unit for transmission control 14 forces the engine to remain at operating points (speed, load) with higher load, particularly, as required, by shifting the higher gear to the one engaged according to the nominal gear shift transition laws. Thus, the engine is prevented from operating with an excessively low load, thereby serving to limit or even prevent the dilution of the fuel in the oil during the delayed and/or late injection phases. Such a device has an application, for example, in motor vehicles with diesel engines and automatic, robotized in automatic mode or CVT gearboxes and equipped with a particulate filter and an oxidation catalyst, during the particulate filter regeneration phases.

In fact, as described above, it is known how to implement a late and/or delayed injection method in order to increase the temperature of the exhaust gases in the particulate filter so as to burn the particulates accumulated in the particulate filter.

In particular, in a motor vehicle equipped with an automatic or robotized gearbox in automatic mode, in such particulate filter regeneration phases, the electronic unit for injection control 10 modifies the injection method in order to make one or more late injections and/or one or more delayed injections. Furthermore, the electronic unit for injection control 10 sends a request to the transmission electronic control unit for the latter to take account of the particulate filter regeneration phase by adopting modified gear shift transition laws like those described above with regard to FIG. 2, for example.

The regeneration phases are initiated, for example, according to criteria of vehicle speed, exhaust gas temperature and/or traces of soot in the particulate filter.

The invention is not reduced to the sole embodiment described here by way of nonlimiting example, and numerous embodiments are feasible without going beyond the scope of the invention.

Thus, it may be observed that the two solutions described for preventing the engine from operating in a zone of critical dilution of the fuel in the oil (shift to lower gear, shift to higher gear) can also be combined, for example, by implementing one or the other of the solutions according to the engine operating point (in particular according to the engine speed and the engine load).

Furthermore, the method according to the invention described above modifies the laws defining the gearbox reduction ratio, in particular, the gear shift transition laws, as soon as the injection method is modified, independently of the engine operating conditions. This means that as soon as the fuel injection is modified, the modified gear shift transition laws are adopted. However, it is quite conceivable for these laws to be adopted only occasionally, when the engine is at a critical speed/load operating point or close to a critical zone with regard to the dilution of the fuel in the oil. Such a situation can be determined by measuring the engine load, for example, using a torque sensor mounted on the primary shaft and by comparing the measured value to the maximum torque that the engine can deliver at the engine speed concerned (see definition of the load).

Furthermore, the method according to the invention can be implemented for other applications. It is advantageously implemented for obtaining exhaust gases loaded with fuel which can burn in the exhaust line, upstream of the combustion chamber and particularly in the oxidation catalyst. A substantial heat source is thereby obtained.

Finally, it should be observed that the modification of the laws defining the change in the gearbox reduction ratio according to the invention is independent of the late or delayed fuel injections, which can be made in various ways without going beyond the scope of the invention (crankshaft angle at the time of the injections, injection time, number of injections).

The invention claimed is:

1. A method for obtaining exhaust gases loaded with fuel by late and/or delayed fuel injection(s) into a combustion chamber of a diesel engine of a motor vehicle including an automatic, robotized, or constantly variable torque gearbox, the method comprising:
   determining a load and an engine speed of the engine;
   determining whether a point corresponding to the load and the engine speed is within an operating zone where a dilution of oil of the engine with the fuel is high, the operating zone being predetermined for a range of loads and a range of engine speeds of the engine;
   modifying laws defining a reduction ratio of the gearbox to limit the dilution of the fuel in the oil present in the combustion chamber when the point is within the operating zone; and
   shifting the reduction ratio of the gearbox such that the point is outside of the operating zone.

2. The method as claimed in claim 1, wherein the laws defining the reduction ratio of the gearbox are modified when the engine operates in the operating zone with critical dilution of the fuel in the oil.

3. The method as claimed in claim 1, wherein in a case of an automatic or robotized gearbox, the gearbox is controlled according to at least one modified gear shift transition law different from a nominal gear shift transition law.

4. The method as claimed in claim 3, wherein in operating conditions of the engine in which the nominal gear shift transition law associates a first gear, the modified law associates a second higher gear.

5. A motor vehicle of the diesel engine type with an automatic, robotized or continuously variable torque gearbox, comprising:
   an electronic unit for gearbox control configured to implement the method for obtaining exhaust gases loaded with fuel as claimed in claim 1.

6. The motor vehicle as claimed in claim 5, further comprising an exhaust line in which a particulate filter is mounted coupled with an oxidation catalyst mounted upstream of the particulate filter or in the particulate filter, wherein soot accumulated in the particulate filter is burned using heat generated by the combustion, which takes place at least partly in the oxidation catalyst, of fuel conveyed by the exhaust gases.

7. The method as claimed in claim 1, wherein the shifting the reduction ratio includes increasing the reduction ratio.

8. The method as claimed in claim 1, wherein the shifting the reduction ratio includes decreasing the reduction ratio.

9. A method for obtaining exhaust gases loaded with fuel by late and/or delayed fuel injection(s) into a combustion chamber of a diesel engine of a motor vehicle including an automatic, robotized, or constantly variable torque gearbox, the method comprising:
   modifying laws defining a reduction ratio of the gearbox to limit dilution of the fuel in oil present in the combustion chamber, wherein
   in a case of an automatic or robotized gearbox, the gearbox is controlled according to at least one modified gear shift transition law different from a nominal gear shift transition law,
   in operating conditions of the engine in which the nominal gear shift transition law associates a first gear, the modified law associates a second higher gear,
   the nominal and modified laws are a function of an accelerator pedal angle and of a speed of the vehicle, and
   the modified law has a plateau at a first accelerator pedal angle in a vehicle speed range in which the nominal law has a plateau at a second accelerator pedal angle lower than the first accelerator pedal angle.

10. The method as claimed in claim 9, wherein the laws defining the reduction ratio of the gearbox are modified when the engine operates in an operating zone with critical dilution of the fuel in the oil.

11. The method as claimed in claim 9, wherein the laws defining the reduction ratio of the gearbox are modified as soon as the engine operates in a late and/or a delayed injection mode.

12. The method as claimed in claim 9, wherein the laws defining the reduction ratio of the gearbox are modified when the engine operates at an engine speed lower than an engine speed threshold, the reduction ratio of the gearbox then being decreased.

13. The method as claimed in claim 9, wherein the laws defining the reduction ratio of the gearbox are modified when the engine operates at an engine load lower than an engine load threshold, the reduction ratio of the gearbox then being increased.

14. A method for regenerating a particulate filter mounted in an exhaust line of a motor vehicle including an oxidation catalyst mounted upstream of or built into the particulate filter, the motor vehicle being of diesel engine type and including an automatic, robotized or continuously variable torque gearbox, the method comprising:

burning soot accumulated in the particulate filter using heat generated by combustion, which takes place at least partly in the oxidation catalyst, of fuel conveyed by exhaust gases obtained by:

determining a load and an engine speed of the engine;

determining whether a point corresponding to the load and the engine speed is within an operating zone where a dilution of oil of the engine with the fuel is high, the operating zone being predetermined for a range of loads and a range of engine speeds of the engine;

modifying laws defining a reduction ratio of the gearbox to limit dilution of the fuel in the oil present in the combustion chamber when the point is within the operating zone; and shifting the reduction ratio of the gearbox such that the point is outside of the operating zone.

* * * * *